United States Patent [19]
Duncan et al.

[11] 3,816,001
[45] June 11, 1974

[54] MEASURING LENGTH AND VELOCITY OF SINGLE STAPLE FIBERS WITHIN AN AIRFLOW

[76] Inventors: William Lankford Duncan, 1232 Frederick St., Waynesboro, Va. 22980; Ronald George Heitz, 1430 Forbes St., North Tonawanda, N.Y. 14120

[22] Filed: June 20, 1972

[21] Appl. No.: 264,580

[52] U.S. Cl. .................. 356/167, 250/560, 302/65
[51] Int. Cl. .......................................... G01b 11/00
[58] Field of Search .......... 356/167, 237; 33/125 A, 33/127; 302/65, 23; 73/160, 37.7; 250/560

[56] References Cited
UNITED STATES PATENTS

| | | | |
|---|---|---|---|
| 705,374 | 7/1902 | Benefield | 302/65 |
| 2,657,474 | 11/1953 | Bledsoe | 302/23 |
| 2,841,048 | 7/1958 | Duncan et al. | 356/237 |
| 3,180,995 | 4/1965 | Briggs et al. | 356/167 |
| 3,591,294 | 7/1971 | Neil | 356/167 |

FOREIGN PATENTS OR APPLICATIONS

1,054,242  4/1959  Germany .......................... 33/125

OTHER PUBLICATIONS

Cadwallader et al., Wire Gage and Straightener, IBM Disclosure Bulletin, V. 9, No. 9, Feb., 1967, p. 1121

*Primary Examiner*—Ronald L. Wibert
*Assistant Examiner*—Paul K. Godwin

[57] ABSTRACT

Apparatus and method for determining length of textile staple filament specimens. The apparatus includes an elongated capillary-like enclosure with a vacuum applied at one end and with light sources and photo-detectors along the capillary. A staple filament when introduced into the open end of the capillary is drawn at high speed past the detector arrays and the average speed of transport of the filament and the time required for the filament to pass a given point are determined by high speed counting apparatus activated by the detectors. Filament length is then computed.

9 Claims, 3 Drawing Figures

MEASURING LENGTH AND VELOCITY OF SINGLE STAPLE FIBERS WITHIN AN AIRFLOW

BACKGROUND OF THE INVENTION

This invention is concerned with rapid, precise determinations of the true length of individual textile staple filaments. More particularly, it covers method and apparatus for determining lengths of uncrimped filaments or filaments in which pre-existing crimp is uniformly suppressed during test and for accomplishing determinations automatically in order to eliminate potential operator bias or error.

In the past when the lengths of individual filament specimens were required to be determined in order to know the variability in specimen length, as well as the average length, it has been customary to separate the individual filaments on a velvet covered board, manually stretch out any crimp and then measure the length visually by use of a calibrated rule. This method is not only tedious but subject to variation because of differences in operator skill and judgment. Other length measuring techniques yield only average values of fiber length within a sample tuft of fibers. For example, Reddick in U.S. Pat. No. 3,039,303 describes a technique of first measuring the tension developed in a tuft of fibers as a function of time while the tuft is slowly drawn at a standard rate. At the same time, the light transmission variation is measured also as a function of time. These results are combined to give an index of average fiber length. Puster in U.S. Pat. No. 2,648,251 teaches a similar technique whereas Lord in U.S. Pat. No. 2,845,837 provides judging average staple length by means of an optical arrangement employed to characterize a doubly fringed sample layer of substantially parallel fibers.

Thus, the prior techniques for measuring staple length are either inconvenient, lack precision, or do not provide for independent determination. Therefore, a direct determination of variability of staple lengths was not possible or was difficult to determine with desired precision and speed.

SUMMARY OF THE INVENTION

This invention provides a method and apparatus for singly measuring the lengths of specimens of fibers. A specimen fiber is projected at a measured average velocity and in a state of substantially no residual crimp past a series of spaced electro-optical detectors for detecting the presence of the fiber. Speeimen velocity is measured by determining the time for one end of the specimen to pass two detectors of known separation in the direction of travel. The elapsed time interval between passage of leading and that of the following end of the specimen is measured as nearly simultaneously as feasible with the velocity measurement. Specimen length is then computed from the product of velocity and the elapsed time. The apparatus of this invention comprises an elongate assembly machined and arranged to provide, near the center thereof, a passageway in the form of an enlarged capillary which is open at one end and arranged to receive a sucker gun or other source of reduced pressure at the other end. The capillary has at least two transparent sides. A series of spaced light sources are arranged, in holders adjacent one of these transparent sides, to project narrow beams of light through this side, illuminating the capillary. A set of identically spaced photocells is inserted in bores adjacent the other transparent side and preferably arranged to receive light transmitted at right angles to the beams of light. The photocells are arranged to provide electrical pulse signals indicative of passage of ends of a filament specimen drawn into and projected through the capillary passageway by means of a sucker gun applied to the exit end of the capillary. The vacuum characteristics of the sucker gun are adjusted to provide essentially laminar air flow in the capillary passageway.

Pulses generated by the photocells are impressed on electronic pulse shaping, logic and timing circuits arranged to determine specimen velocity and elapsed time for front to rear specimen passage. A computer is employed to provide computation of the product of velocity and the elapsed time and thus a measure of filament length. The computer may also be arranged to record individual filament length determinations and further compute desired indices of variability.

In another embodiment of this invention, one or more third detectors comprising a light source and photocell is provided downstream from the second detector at an accurately predetermined distance. This distance is prescribed, for a given nominal staple length, to be slightly less than the shortest filament length expected to be measured for this nominal length. Additional auxiliary detectors are provided when additional nominal ranges of fiber length are to be measured. Electrical switching arrangement is provided to bring the proper auxiliary detector into active circuit use. In this embodiment, the electronic circuitry is arranged so that when the leading end of the fiber specimen passes the auxiliary detector, the elapsed time counter is started and when the following end of the specimen reaches the number two detector, this count is terminated. Then the fiber length will be a constant, namely the separation of number two detector and the auxiliary detector, plus a factor determined from the elapsed time and velocity. It has been fount that this improvement provides increased precision of measurement.

DETAILED DESCRIPTION OF THE ILLUSTRATED EMBODIMENTS

Figure 1:
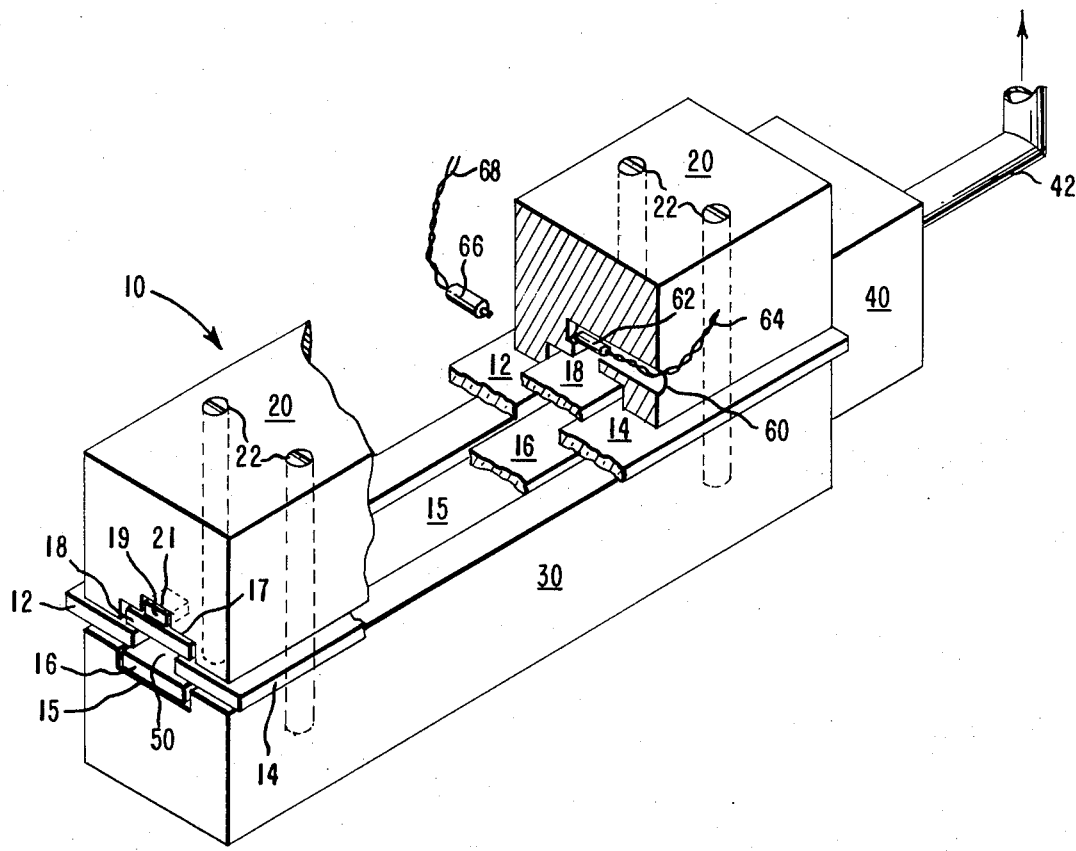
FIG. 1 is an isometric representation of the block containing the capillary and detector components with part of the central portion cut away and partially sectioned to show the placement of one of the light sources and one of the photocells.

Referring to FIG. 1, transporter/detector block 10 is an assembly comprising a photocell holder 20, a base element 30 and a vacuum adapter 40. Four transparent plates 12, 14, 16, 18 of, e.g., Lucite acrylic resin are arranged in between holder 20 and base element 30 to form a fiber transport passage 50 which will hereafter be designated the "capillary." A channel 15 is machined in base 30 along the length thereof of the face which abutts holder element 20. Channel 15 is arranged to receive plate 16 and has a thickness equal to the thickness of plate 16. Similarly, a channel 17 is machined in the lower face of holder 20 to receive plate 18 in the same manner as plate 16 fits into base 30. The upper face of plate 16 and the upper and lower faces of plate 18 are polished. A secondary channel 21 of about half the width of channel 17 is machined the full length of holder 20. It extends up from the roof of channel 17 and is symmetrical with this channel. Transparent plates 12, 14 have not only polished faces, but also polished edges. These are carefully assembled between elements 20 and 30 with edges parallel and spaced to provide fiber transport capillary 50. Four through bolts 22 extending through plates 12, 14 hold elements 20 and 30 securely together after the capillary 50 has been accurately aligned. In the preferred embodiment, a set of six holes, not shown, are drilled from the top of holder 20 through the bottom of base 30 after plates 12 and 14 are precisely aligned against a spacer rod to provide a uniformly wide capillary 50. Aligning pins are provided for these holes. The spacer rod is then removed. Vacuum adapter 40 is then attached by suitable means not shown to the back end of block 10.

Secondary channel 21 is closed off at each end by blackened end plugs 19 to mask out stray light. This secondary channel 21 is provided to facilitate the arrangement of photocells which view the capilliary 50 from points which are located directly above its center line and are spaced along the photocell holder at predetermined locations. One of these photocell arrangements is shown in connection with the crosssectional cutout of FIG. 1. Thus, for each photocell 62 a horizontal bore 60 extends in from the near face of holder 20. This bore 60 is located and extended so that it projects through secondary channel 21, thus forming an optical "slit" for restricting the photocell's lengthwise view. A small photocell 62 such as a Hoffman, Type EA7E-1, is fastened in bore 60 and oriented so that its sensitive portion faces vertically downward toward the center line of capillary 50. Leads 64 are brought out from photocell 62 and extend to the electronic timing, computing and readout circuitry of FIG. 2. A prefocused light source 66, e.g., Chicago Miniature Lamp Co., lamp type Cm-253 is mounted by means not shown and aligned so that its axis is parallel to the axis of bore 60 but placed so as to project a beam of light in a horizontal direction through transparent plate 12. This beam intersects the vertical line through the sensitive portion of photocell 62 at the center of capillary 50. Slits, not shown, may be used in front of the light source and photocell. Thus, when there is no fiber in the capillary 50 near this point of intersection of the light source and viewing line of the photocell, the photocell will view a dark field. However, when the end of a fiber specimen passes this point, a sharp change in illumination will occur and a pulse will be generated by the photocell. Leads 68 extend from light source 66 to a conventional electrical power source of regulated voltage.

Vacuum adapter 40 is provided with a pipe extension 42 which is coupled to a source of reduced air pressure such as a conventional fiber handling sucker gun. Thus, when a filament specimen to be measured is brought up to the leftland, open, end of capillary 50 while the suction is applied to adapter 40, the specimen will be drawn into the capillary, transported at high speed past the light source and photocell detectors and projected out pipe 42 to a collector not shown.

The size of capillary 50 is selected as a compromise between a cross-section small enough to iron out most of the crimp found in the type of fiber to be measured as opposed to the ability of the capillary to accept and transport the filaments at high speed and be large enough to keep the buildup of contamination within the capillary to a reasonable level. The pressure drop through the capillary 50 is selected also as a compromise to be large enough so that fibers are transported at high speed through a laminar air flow condition but not with a high enough pressure differential to destroy this laminar flow. In one preferred embodiment constructed for measuring filaments of synthetic material which are crimped and of denier per filament in the range of 3 to 20, the capillary cross section size was selected to be 0.08 cm. in both height and width. For this embodiment, the pressure drop through the capillary was found to be about optimum when 36 cm. Hg. gage pressure was achieved at the exit.

Figure 2:
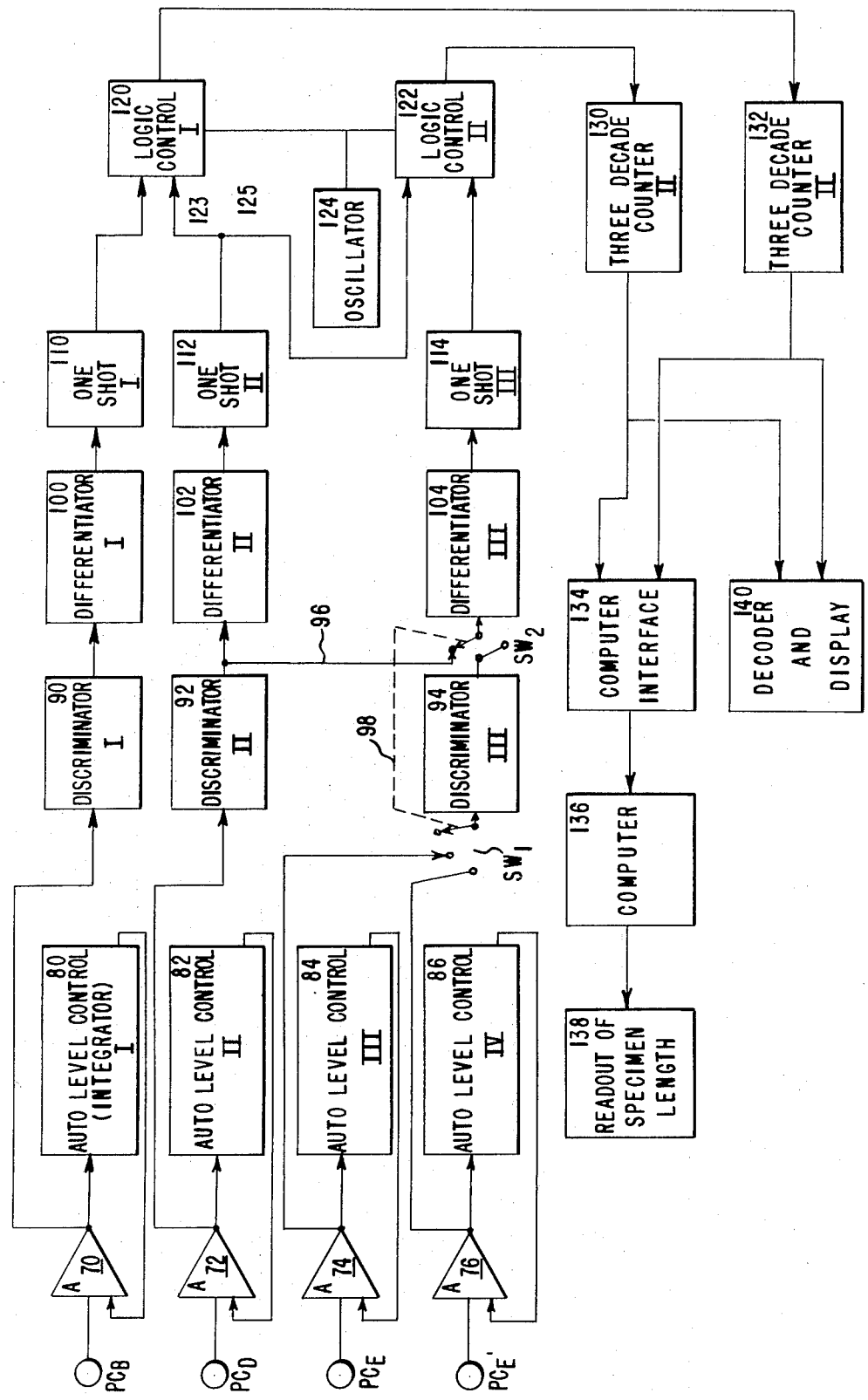
FIG. 2 is a functional block diagram of the electronic components for use with the block assembly of FIG. 1.

The location and number of photocell/light source detector sets depends upon the nominal length of filament specimen to be tested and on the precision of measurement desired. Thus, in the case of the simplest embodiment of this invention, two such detector sets were used. When designed for measurement on filaments of nominal length 2.85 cm., the separation along the capillary between these two detector sets was made 1.97 cm. Thus in this case, as shown diagrammatically in FIG. 3, the first photocell detector set is located along the capillary 50 at a point designated by the arrow B and the second detector set by the arrow D. The separation between these two detector sets is designated as $d$. When the filaments of longer nominal length are to be measured, the effects of changing filament velocity such as acceleration within the capillary 50 past the detector positions require compensation and a third detector set is used. Thus in FIG. 3, a third detector set is located at position E. The distance between detector set D and set E is designated as $L_0$. In the case of filaments having a nominal length of 3.8 cm., $L_0$ was chosen to be 2.9 cm. whereas for filaments of nominal length 5.1 cm., $L_0$ was selected to be 4.2 cm. Obviously, several photodetector sets E, E', etc., could be employed at locations preselected for several filament nominal lengths to be measured and switching arrangements (as shown in FIG. 2) provided to select that particular set E appropriate to the nominal filament length under examination at any particular time. The selection of the magnitude of $L_0$ will depend to a large extent on the sensitivity of the electronic timing apparatus available but must, as evident from the discussion of the method of measurement given below, be made smaller than the minimum length fiber specimen expected to be measured in a given specimen population. However, in order to minimize the effects of velocity change while the sample is passing the detectors, the magnitude of $L_0$ must be kept as large as possible within the above restriction.

Figure 3:
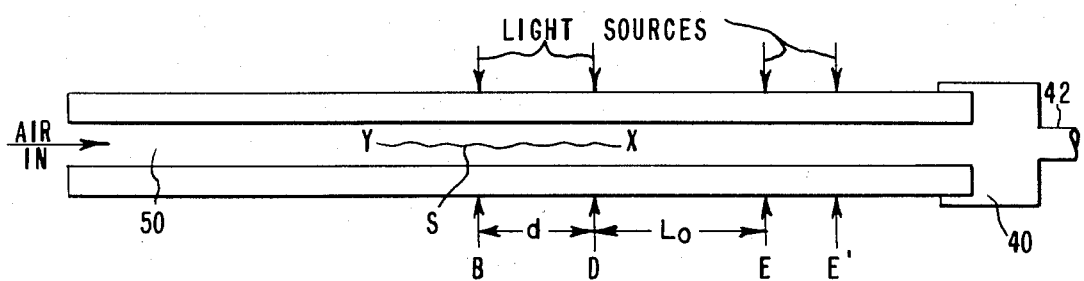
FIG. 3 is a schematic showing of a staple fiber specimen in transit through the capillary passage of the fiber transport and detector block. This is used in explaining the modes of operation for both two and three detector embodiments of the invention.

To better understand the method of measurement by this invention, further reference is made to FIG. 3. The filament specimen is designated S and has a leading end X and a trailing end Y. In the case of the simplest embodiment where only two detector sets B, D are used, the electrical pulse formed as a result of the leading end X passing photocell D is shaped and employed to start the first counter which will be called the "length counter."A second pulse is formed when the trailing end Y passes photocell B. This second pulse is employed to start the second counter which will be referred to as the "velocity counter." Finally, a third pulse is generated when the trailing end Y passes photocell D. This pulse is used to stop both the length counter and the velocity counter.

If we let $\Delta t_1$ equal time registered on the velocity counter (time required for Y to pass from B to D which is a distance $d$ cm.), then the specimen velocity, $v$, is determined by:

$$v = d/\Delta t_1$$

Similarly, if $\Delta t_2$ equals time registered in the length counter (time elapsed between X passing D and Y passing D), then the true length, L, is determined by the equation:

$$L = v\, \Delta t_2 = d\, \Delta t_2/\Delta t_1$$

In the case where three detector sets are used, the first pulse that is employed for counting occurs when leading edge X passes detector E. This is employed to start the length counter. The second pulse that is used in this case occurs when trailing edge Y passes detector B. This is employed to start the velocity count. The third pulse employed occurs when Y passes D and is used to stop both the velocity count and the length count.

Again, let $\Delta t_1$ equal time registered on the velocity counter and therefore, as above, the velocity, $v$, is given by:

$$v = d/\Delta t_1$$

As before, $\Delta t_2$ equals time registered in the length counter but in the present case, it now is the time elapsed between X passing E and Y passing D. Therefore, $\Delta t_2$ = incremental time required for an incremental length (L − $L_0$) to pass point D at a velocity, v, where $L_0$ is the distance between D and E.

Then:

$$v\, \Delta t_2 = L - L_0 = d\, \Delta t_2/\Delta t_1$$

and therefore:

$$L = L_0 + d\, \Delta t_2/\Delta t_1$$

This computation or the one required by the equation shown in the previous paragraph is accomplished, as described below by reference to FIG. 2, by means of either a general purpose computer or special purpose mini-computer. On the other hand, the computation may be made by other means such as the slide rule from the readout display of the length and velocity counts. The use of the third detector set E, as noted earlier, enables the two measurements (velocity and length counts) to be made during nearly the same real time interval even through a comparatively long filament is under measurement.

The electronic circuitry required to practice this invention is sufficiently conventional that it will be described by reference to the block diagram shown in FIG. 2. Here, $PC_B$, $PC_D$, $PC_E$ and $PC_E'$ represent photocells at locations B, D, E and E', respectively. These are connected each to its individual amplifier 70, 72, 74, 76 each of which has its individual automatic level controller (ALC) 80, 82, 84 and 86. Output of amplifier 70 is connected directly to discriminator 90 and amplfiier 72 to discriminator 92. Output of amplfifier 74, however, is connected to one input pole of one section SW-1-A of a selector switch. Similarly, amplifier 76 is connected to a second input pole of this switch section. The third input pole is insulated. The wiper of this switch section is connected to discriminator 94 whose output goes to two poles of the second section SW-1-B of the selector switch. The third input pole of this latter section is connected by wire 96 to the output terminal of discriminator 92. In this way, an insulated mechanical linkage between the wiper arms of the two sections is provided in order to coordinate their motion. The wiper of section SW-1-B leads to a differentiator circuit 104. Similarly, the output of discriminator 90 is connected to differentiator 100 and the output of discriminator 92 to differentiator 102. The outputs of these three differentiator circuits are respectively connected to three one-shot circuits 110, 112 and 114. The output of one-shot 110 is connected to one input terminal of logic control circuit 120 over line 121. One-shot 112 is connected over line 123 to the second input terminal of logic circuit 120 and in addition over line 125 to a second logic control circuit 122. Oneshot 114 is connected to the second input terminal of logic circuit 122. The output of a crystal controlled oscillator 124 (operating at, for example, 1 MHz) is connected to both logic control circuits 120, 122 at the input terminals of the gating components of these control circuits. The outputs of these two logic control circuits, 120, 122 are respectively connected to decade counters 130, 132 each of which are in turn connected to the input terminals of a computer interface 134 and thence to a computer 136 and finally to a readout device 138. The output of counters 130 and 132 may also be connected to a decoder and display circuit 140 which display values of $\Delta t_1$ and $\Delta t_2$ defined above by reference to FIG. 3. These display values may then be used to compute the value of the specimen length in accordance with the equations given earlier by reference to FIG. 3.

The use of this invention in connection with routine measurements on staple filament lengths has shown distinct advantages not only in ease of manipulating specimens for measurement but also more rapid measurement per specimen, equivalent precision and increased ease of recording, averaging and reading out results. For example, a comparison was made between measurements by the manual technique (described above wherein individual specimens are laid out on a velvet covered board and measured by a hand rule) as compared to results obtained by means of the present invention on the same specimens. It was found that the average values of specimen length agreed to within less than 2 percent and that the precision of measurements as indicated by the coefficient of variation and the confidence limits at 95 percent probability were nearly the same. Another evaluation comprised repeated measurements on the same specimen by means of the apparatus of this invention. Each of several filament specimens was in turn trapped at the vacuum jet exit and measurements were repeated ten times. Repeatability was found to be 0.05 cm., the theoretical resolution of the instrument.

This invention has been described by way of two specific preferred embodiments. One of these embodiments employs only two light source/photodetector elements whereas the second embodiment employs three, with location of the third depending on the nominal staple length to be examined. In these embodiments a sandwich-type structure is disclosed for the formation of the capillary employed to transport and straighten out the crimp in the specimens. Many variations will be apparent to those skilled in the art and may be made without departing from the spirit of the present invention.

What is claimed is:

1. A method for determining the length of a single staple fiber comprising: projecting a staple fiber without substantial residual crimp past a series of spaced detectors for detecting the presence of said fiber wherein the step of projecting a staple fiber without substantial residual crimp comprises withdrawing said fiber past said detectors through a capillary by means of essentially laminar gas flow; measuring a first time period for one end of said fiber to pass two said detectors spaced a know distance apart; determining the velocity of said fiber according to the relationship of said distance divided by said first time period; measuring a second time period for the passage of opposite ends of said fiber past one of said detectors; and determining the length of said fiber according to the relationship of said velocity times said second time period.

2. The method as defined in claim 1, said distance being less than said fiber length.

3. A method for determining the length of a single staple fiber as defined in claim 1 comprising: projecting a staple fiber without substantial residual crimp past two spaced electro-optical detectors; and determining said length according to the following relationship:

$$L = d - \Delta t_2/\Delta t_1$$

where;
- $L$ = said length in centimeters
- $d$ = distance between two of said detectors in centimeters
- $\Delta t_1$ = the elapsed time in microseconds for one end of said fiber to pass said two detectors and
- $\Delta t_2$ = the elapsed time in microseconds for opposite ends of said fiber to pass one of said detectors.

4. A method for determining the length of a single staple fiber as defined in claim 1 comprising: projecting a staple fiber having leading trailing ends without substantial residual crimp past three spaced first, second and third electro-optical detectors and determining said length according to the following relationship:

$$L = L_o + d \times \Delta t_2/\Delta t_1$$

where
- $L$ = said length in centimeters
- $L_o$ = the distance in centimeters between said second and third detectors
- $d$ = the distance in centimeters between said first and second detectors
- $\Delta t_2$ × the elapsed time in microseconds between said leading end passing said third detector and said trailing end passing said second detector and
- $\Delta t_1$ = the elapsed time in microseconds for said trailing end to pass between said first and second detectors.

5. An apparatus for determining lengths of staple fibers comprising an elongated member having a capillary passage therethrough; a source of reduced pressure connected to one end of said passage for withdrawing a single staple fiber fed to the other end of the passage through said passage; a plurality of detectors spaced along said passage for detecting the presence of said fiber; means actuated by said detectors for determining the velocity of said fiber and the elapsed time for said fiber to pass one of said detectors and means for calculating the length of said fiber as a product of said velocity and said time.

6. The apparatus as defined in claim 5, said passage having transparent sides, said detectors each comprising a light source and a photocell angularly positioned in the same plane with respect to each other positioned adjacent to said transparent sides.

7. The apparatus as defined in claim 6, said photocell having a viewing axis, said light source having an illumination axis, said viewing and said illumination axis being angularly positioned in the same plane with respect to each other.

8. The apparatus as defined in claim 7, said axis being angled at about 90° with respect to each other.

9. The apparatus as defined in claim 5, said source of reduced pressure being a sucker gun having vacuum characteristics to provide essentially laminar flow in said passage.

* * * * *

UNITED STATES PATENT OFFICE
CERTIFICATE OF CORRECTION

Patent No. 3,816,001          Dated June 11, 1974

Inventor(s) William Lankford Duncan & Ronald George Heitz

It is certified that error appears in the above-identified patent and that said Letters Patent are hereby corrected as shown below:

Claim 3, column 7, line 33, the formula reading $$L = d - \triangle t_2 / \triangle t_1 \quad \text{should read:}$$

$$L = d \times \triangle t_2 / \triangle t_1$$

Claim 4, column 8, line 11, the explanation for $\triangle t_2$ should appear as:

$$\triangle t_2 = \text{the elapsed time in microseconds between said....}$$

Signed and sealed this 17th day of September 1974.

(SEAL)
Attest:

McCOY M. GIBSON JR.          C. MARSHALL DANN
Attesting Officer          Commissioner of Patents